US012752563B2

(12) United States Patent
Barberan Latorre

(10) Patent No.: US 12,752,563 B2
(45) Date of Patent: Oct. 6, 2026

(54) METHOD AND SYSTEM FOR PRODUCING A MOTIF ON A SUBSTRATE

(71) Applicant: Jesús Francisco Barberan Latorre, Castelldefels (ES)

(72) Inventor: Jesús Francisco Barberan Latorre, Castelldefels (ES)

( * ) Notice: Subject to any disclaimer, the term of this patent is extended or adjusted under 35 U.S.C. 154(b) by 289 days.

(21) Appl. No.: 18/546,666

(22) PCT Filed: Feb. 25, 2022

(86) PCT No.: PCT/ES2022/070100
§ 371 (c)(1),
(2) Date: Aug. 16, 2023

(87) PCT Pub. No.: WO2022/180292
PCT Pub. Date: Sep. 1, 2022

(65) Prior Publication Data

US 2024/0140122 A1 May 2, 2024

(30) Foreign Application Priority Data

Feb. 26, 2021 (EP) .................................... 21382167

(51) Int. Cl.
*B41M 5/00* (2006.01)
*B08B 3/14* (2006.01)
(Continued)

(52) U.S. Cl.
CPC ............. *B41M 5/0047* (2013.01); *B08B 3/14* (2013.01); *B41M 3/06* (2013.01); *B41M 7/0081* (2013.01); *B44C 1/18* (2013.01); *B65G 45/10* (2013.01)

(58) Field of Classification Search
CPC .... B41M 5/0047; B41M 3/06; B41M 7/0081; B41M 7/00; B41M 5/382; B08B 3/14;
(Continued)

(56) References Cited

U.S. PATENT DOCUMENTS

2001/0022607 A1 9/2001 Takahashi et al.
2008/0138512 A1* 6/2008 Conley .................... B05D 5/06 427/508

(Continued)

FOREIGN PATENT DOCUMENTS

EP 3109056 A1 12/2016
JP 2003066738 A * 3/2003

(Continued)

OTHER PUBLICATIONS

English Translation KR20160019853 (Year: 2016).*

(Continued)

*Primary Examiner* — Ricardo I Magallanes
*Assistant Examiner* — Tracey M Mcmillion
(74) *Attorney, Agent, or Firm* — LUCAS & MERCANTI, LLP

(57) ABSTRACT

A method and system for producing a motif (7) on a substrate (1; 4), the method, successively, providing a base layer (2) at least partially covering the substrate (1; 4), applying a plurality of drops in or on the base layer (2) and transferring at least part of a liquid (3) that has the drops or is at least partially determined by them to a transfer surface (S), by adhesion of the liquid (3) to the transfer surface (S) when the transfer surface (S) makes contact with the liquid (3) without sliding on the base layer (2), in order to at least partially reveal the motif (7).

21 Claims, 18 Drawing Sheets

(51) Int. Cl.

| | |
|---|---|
| ***B41M 3/06*** | (2006.01) |
| ***B41M 7/00*** | (2006.01) |
| ***B44C 1/18*** | (2006.01) |
| ***B65G 45/10*** | (2006.01) |

(58) Field of Classification Search

CPC .. B44C 1/18; B65G 45/10; B05D 1/28; B05D 1/322; B05D 3/067; B05D 3/12; B05D 5/062

USPC .......................................................... 347/103

See application file for complete search history.

(56) References Cited

U.S. PATENT DOCUMENTS

| | | | |
|---|---|---|---|
| 2010/0092688 A1 | 4/2010 | Serbutoviez et al. | |
| 2014/0196618 A1 | 7/2014 | Pervan et al. | |
| 2020/0346246 A1* | 11/2020 | Pankoke | B44C 3/005 |
| 2021/0268820 A1* | 9/2021 | Xu | B41J 29/36 |

FOREIGN PATENT DOCUMENTS

| | | | | |
|---|---|---|---|---|
| JP | 2009226907 A | 10/2009 | | |
| KR | 20160019853 A | * | 2/2016 | B41M 1/02 |
| WO | 2010070485 A2 | 6/2010 | | |
| WO | 2011126148 A1 | 10/2011 | | |
| WO | 2020039361 A1 | 2/2020 | | |
| WO | 2020225210 A2 | 11/2020 | | |

OTHER PUBLICATIONS

English Translation 2003066738 (Year: 2003).*

International Search Report for Corresponding International Application No. PCT/ES2022/070100, 6 pages, May 20, 2022.

ES Search Report for corresponding Application No. ES 21382167 dated Aug. 16, 2021, 8 pages.

* cited by examiner

METHOD AND SYSTEM FOR PRODUCING A MOTIF ON A SUBSTRATE

CROSS REFERENCE TO RELATED APPLICATION

This Application is a 371 of PCT/ES2022/070100, filed on Feb. 25, 2022, which claims the benefit of European Patent Application No. 21382167.1, filed on Feb. 26, 2021, each of which are incorporated herein by reference.

TECHNICAL FIELD

The present invention relates to a method and a system for producing a motif such as, for example, a relief or a texture, on a substrate, wherein on a base layer that extends on the surface of the substrate a plurality of drops that determine the motif is applied, for example, by means of digital inkjet printing.

The invention is particularly applicable in the field of manufacturing products for construction and furniture, such as panels for furniture, doors and floors, profiles for door and window frames, etc.

STATE OF THE ART

Currently, methods and systems for producing motifs on substrates by applying a plurality of drops, for example, by means of digital inkjet printing, on a base layer that extends on the surface of the substrate are well known. These methods and systems have the advantage of the high flexibility and precision thereof compared to other methods and systems for producing motifs on substrates, such as engraving or moulding.

For example, the document US2010/092688 discloses a method for producing reliefs on substrates by means of digital inkjet printing on a liquid base layer that extends on the substrate. The drops and the liquid base layer are configured to be immiscible with each other, such that the injected drops repel the liquid surface of the base layer whereon they are applied, being introduced into the base layer in order to generate the relief once the base layer has solidified.

Likewise, the document WO2010070485A2 discloses a method and system for producing reliefs on substrates by means of digital inkjet printing on a liquid base layer that extends on the substrate. The drops are configured to provide a masking effect with respect to the liquid base layer, inhibiting the solidification of the liquid base layer in the positions wherein the drops are applied, by blocking the passage of curing or heating radiation to the liquid base layer. Once the base layer has solidified, the material located underneath the drops, the solidification of which has been inhibited, is soft or partially solidified, such that it can be easily removed from the base layer in order to produce the reliefs. In order to remove said material and the drops, means such as brushes or vacuums are mentioned.

Likewise, the document WO2011126148A1 discloses a method for producing reliefs on substrates by means of digital inkjet printing on a liquid base layer that extends on the substrate. The drops injected on the liquid base layer produce negative reliefs in the base layer due to the impulse or amount of movement of the drops when they impact the liquid base layer, viscosity and/or surface tension of the drops and of the liquid base layer.

In a similar manner, the document WO2020039361A1 discloses a method and system for producing reliefs on substrates by means of digital inkjet printing on a liquid base layer that extends on the substrate. The drops and the base layer are solidified, for example, cured by UV, and the drops are configured to inhibit or modify the solidification, for example, by a cure inhibitor, such as UV absorbers, such that the areas of the base layer wherein the drops have been applied are softer or more brittle than the rest of the base layer. Consequently, the resulting product corresponding to the mixture of the drops and the base layer in said areas can be easily removed from the base layer in order to produce the reliefs. In order to remove said resulting product, means such as brushing, jets of air or water, a tape or an adhesive roller or solvents are mentioned.

The known means for removing the resulting product, resulting product being understood in general in the context of the present invention as that which comprises or is determined at least partially by the drops applied, have the drawback that due to the abrasion that may be required in order to remove enough resulting product, they cause the motifs obtained to lose sharpness or definition. The removal of the resulting product is performed by dragging force or in such a way that said product, by means of a mobile or fluid element which drives said product, is able to be removed, extracted or separated from the base layer.

The use of adhesive rollers or tapes, i.e., provided with an adhesive, in addition to requiring that the product resulting from the applied drops be in a solid state in order to be removed, have the drawback that they tend to make the surface of the base layer dirty with traces of adhesive which adhere to the base layer, requiring an additional step of removing the adhesive from the surface of the base layer, once again susceptible to causing the motifs obtained to lose sharpness or definition, due to the abrasion which may be necessary to remove or separate the adhesive. Moreover, the use of solvents also has the drawback of the deterioration which may occur on the surface of the base layer due to the action of the solvent itself.

Removing the product resulting from the applied drops by heating, evaporating or drying said product is also known in the state of the art. Alternatively or in a complementary manner, a trace of said product can remain solidified, in particular cured, especially together with the base layer on the motif obtained.

The means for removing the resulting product by heating, drying or evaporating have the drawback that they may not be effective in removing a sufficient amount of product to enable specific motifs to be obtained, such as reliefs with at least a certain depth.

Additionally, the known means for removing the resulting product also have the drawback of the difficulty of the cleaning or maintenance thereof, as a consequence of the fact that when the product is removed it accumulates in said means, for example, in the bristles of the brushes, or it is spread in an unpredictable or uncontrolled manner.

In view of the currently existing known solutions, the present invention aims to provide an alternative or complementary method and system for producing motifs on substrates which enables the aforementioned drawbacks to be solved.

OBJECT OF THE INVENTION

In order to fulfil the purpose mentioned in the previous section, in addition to providing additional advantages that can be derived from the present specification, the present invention provides a method for producing a motif on a substrate, comprising, successively, providing a base layer at least partially covering the substrate, applying a plurality of drops in or on the base layer and transferring at least part of a liquid that comprises said drops or is at least partially determined by them to a transfer surface, by adhesion of said liquid to the transfer surface when the transfer surface makes contact with said liquid without sliding on the base layer, in order to at least partially reveal the motif.

In the context of the present invention, motif can be understood, in particular, as a decoration or a relief. Relief can be understood, in particular, as a three-dimensional surface or a texture. The motif can be decorative or functional. Examples of decorative motifs are a matte finish or a texture imitating natural surfaces, such as rock or wood. Examples of functional motifs are motifs for modifying the physical properties of the substrate, such as the elasticity, adhesion, strength, surface roughness, etc., optical or haptic properties thereof. Microstructural functional motifs can be used in the fields of biology, optics, electronics, etc. For example, they are used in optics to produce Fresnel lenses; in electronics to produce circuits, in particular microfluidic conduits; and in biology to produce drugs.

The relief which can be obtained by applying the method can be positive (protrusions on the base layer) or negative (recesses in the base layer). The motif can also consist of, for example, what is called reverse printing, wherein a previously applied background under the base layer is made visible by removing transfer liquid from the base layer. Reverse printing advantageously enables decorations to be obtained with inks which due to the features thereof cannot be printed by inkjet (for example, inks with solid particles, in particular metallic ones) by applying said inks on the background which becomes visible after the method.

According to the invention, the transfer of the liquid resulting from the applied drops to the transfer surface is performed by adhesion, i.e., especially, by wetting said surface, when the resulting liquid makes contact with the transfer surface without the transfer surface sliding on the base layer. The transfer of said liquid takes place by the action of intermolecular forces, such as Van der Waals forces, which, according to the invention, act between the transfer surface and said liquid when the transfer surface and said liquid make contact with each other without the transfer surface sliding on the base layer and, therefore, preventing a dragging component of said liquid tangential to the base layer. By preventing this tangential component, the invention makes it possible to remove the product (liquid) resulting from the applied drops without significantly deforming or moving said product locally in the tangential direction when contact is made, thus preventing slipping of the product on the base layer when the motif is revealed and consequently defects in the sharpness or definition of the motif to be obtained.

The transfer of the liquid resulting from the drops applied to the transfer surface is performed when the resulting liquid makes contact with the transfer surface, it being facing or opposite from the surface of the base layer.

The transfer surface can be the rolling surface of a transfer roller. The rolling of the transfer roller on the base layer is performed without sliding. To this end, preferably, the rotation of the transfer roller is actuated, in particular, in a manner synchronised with the transport of the substrate, in other words such that the linear speed of the rolling surface (transfer surface) in the contact thereof with the base layer is essentially zero with respect to the base layer. When the transfer roller rolls without sliding on the base layer, the relative speed of the rolling surface with respect to the base layer is zero, the transfer being performed locally in a static manner, and therefore preventing defects in the motif to be obtained as a consequence of the transfer liquid slipping with respect to the application position of the drops.

According to the invention, the transfer surface can be any surface which is facing or opposite from the base layer or the substrate in order to make contact with the transfer liquid. For example, it can also be the front surface of a transfer sheet which is facing the base layer. Likewise, it is also envisaged that instead of a transfer roller or a transfer sheet (continuous or discontinuous) as a transfer element, any other element comprised by the transfer surface can be used, for example, a plate with a front surface (transfer surface) which is facing the base layer.

The base layer extends at least partially over the surface of the substrate. A liquid base layer can be applied, for example, by means of a roller, spraying or printing, in particular by inkjet.

The drops are applied in or on the base layer, in particular, which is at least partially liquid, such that the applied drops settle into, are introduced into and/or displace the liquid base layer in the positions wherein the drops are applied. The motif is formed in or on the base layer, being at least partially revealed on the base layer, in particular by removing at least partially, more in particular, completely, the transfer liquid. In particular, a relief can be formed in the base layer when the volume occupied by the transfer liquid in the base layer is released.

By modifying the compositions of the drops and/or of the liquid base layer, for example, in order to obtain a certain viscosity, density or surface tension of said liquids when the drops are applied, as well as parameters of the method of application of the drops in or on the liquid base layer such as, for example, the injection speed or the injection volume of the drops, and/or other parameters of the method, it is possible to control or influence the motifs to be obtained, such that the applied drops settle into, are introduced into and/or displace the liquid base layer in the positions wherein they are applied. To this end, the practical content of the disclosures cited in the State of the Art section is incorporated into the present specification by reference, insofar as it is applicable to the method and system for producing motifs on substrates according to the present invention.

Other parameters of the method which can be modified to obtain required motifs include, for example, the degree of solidification or curing of the drops, the transfer liquid and/or the base layer, the pressure exerted by the transfer surface or the height at that which the transfer surface is arranged on the surface of the base layer when the transfer liquid is transferred, etc. The degree of solidification of the base layer, of the drops or of the transfer liquid, in particular the degree of curing, can be determined by means of the amount of energy transferred, for example, by radiation or by heat, with respect to the total energy transferred until the solidification is completed.

In particular, it is envisaged that, to increase the adhesion or wettability of the transfer liquid and/or decrease the adhesion or wettability of the base layer to/on the transfer surface, the viscosity and/or the surface tension of the liquid base layer, drops and/or transfer liquid when the drops are applied and/or at least one parameter of the method are selected so that the surface energy of the transfer surface is preferably greater than the surface tension of the liquid to be transferred and/or less than or equal to the surface tension, or surface energy, of the base layer when the liquid is transferred.

Likewise, with the same objective mentioned in the previous paragraph, it is envisaged that the viscosity and/or the surface tension of the liquid base layer, the drops and/or the transfer liquid when the drops are applied and/or at least one parameter of the method are selected so that the viscosity of the transfer liquid is preferably less than the viscosity of the base layer when the liquid is transferred.

Especially, the transfer liquid is less viscous and has a lower surface tension than the base layer, while the surface tension, or surface energy, of the transfer surface is higher than the surface tension of the transfer liquid when the liquid is transferred. This facilitates the transfer of the liquid to the transfer surface by adhesion, due to the intermolecular forces between the liquid and the transfer surface. Additionally, by increasing the viscosity of the transfer liquid when the liquid is transferred, the internal cohesion of the transfer liquid is able to be increased, due to the internal intermolecular forces, and therefore it is possible to influence the amount of liquid removed in each transfer by modifying the viscosity.

Preferably, the surface tension and/or the viscosity of the transfer liquid when it is transferred should be low enough to facilitate the wetting of the transfer surface with the transfer liquid. Likewise, preferably, the surface tension and/or viscosity of the base layer when the transfer liquid is removed should be high enough to impede the wetting of the transfer surface with the base layer.

Preferably, according to the invention, the base layer is at least partially solidified, before transferring the transfer liquid by means of the transfer surface, until a surface tension, or surface energy, of the base layer is reached which is greater than or equal to the surface energy of the transfer surface.

The solidification of the base layer, the applied drops and/or the transfer liquid can be performed, for example, by curing, in particular by radiation, more in particular by electromagnetic radiation, preferably by UV. In the context of the present invention, the term curing comprises the concept of polymerisation. Alternatively or in a complementary manner, the solidification can be performed, for example, by heating, drying and/or evaporation, etc.

Preferably, the drops are applied selectively, more in particular according to a pattern, for example which is digital, in particular by means of digital printing, preferably by inkjet. Especially, the digital pattern is aligned with an image on the substrate, such that a motif such as, for example, a relief, is synchronised with the image in at least one area of the base layer. In this manner, it is possible to imitate natural colours or textures, such as, for example, wood or rock, including grain or cracks, in a more realistic manner.

According to the invention, the transfer liquid is determined by, or comprises, at least partially the drops applied. In other words, at least part of the transfer liquid can result from physical and/or chemical changes of the applied drops by themselves and/or by interaction with the base layer, in particular by chemical reaction, mixing or immiscibility between the applied drops and the base layer.

Preferably, the drops and/or the transfer liquid may be configured to cancel out or inhibit the solidification thereof with respect to the solidification of the base layer. In particular, the drops and/or the transfer liquid can be configured to solidify to a lesser extent than the base layer, in other words such that, for example, when the base layer is completely solidified, the drops and/or the transfer liquid are partially solidified. For example, by using drops or transfer liquid of a non-curable material such as, for example, water, it is possible to cancel out the solidification thereof. Likewise, for example, it is possible to inhibit solidification by UV curing by means of UV absorbers.

The base layer, in particular which is liquid, can be made up of, for example, a UV-polymerisable resin, in particular acrylic or acrylate resin. The drops may further comprise a UV-polymerisable resin, in particular an acrylic or acrylate resin. The drops may be provided with a cure inhibitor, for example, configured to partially absorb the electromagnetic radiation, in particular in comparison with the base layer. Examples of UV cure inhibitors are benzophenones, benzotriazoles, hindered amines and/or oxamides. Likewise, the drops can be provided with a surface tension increasing agent such as, for example, surfactants. Likewise, the drops can be provided with a viscosity-lowering agent such as, for example, water and/or solvents such as alcohol or glycol.

Preferably, the transfer liquid is at least partially removed by means of a transfer surface before and/or after at least partially solidifying the base layer. The applied drops and/or the transfer liquid can be at least partially solidified, in particular together with the base layer. In other words, the base layer, the drops and/or the transfer liquid may be configured to be solidified in the method, in particular being curable.

It is also envisaged that the liquid base layer can be at least partially solidified before the drops are applied. This enables the parameters for obtaining a specific motif by applying the drops to be controlled, in particular the viscosity and/or surface tension of the base layer, of the drops and/or of the transfer liquid, when the drops are applied.

The transfer surface can be configured to exert an adjustable pressure against the base layer and/or be brought closer to the base layer in order to be arranged at a certain height with respect to the surface of the base layer. To do so, the transfer surface can be adjustable in height with respect to the surface of the substrate. A reduction in the height enables a greater pressure to be provided on the base layer and vice versa. Likewise, the height adjustment enables, in particular, the adaptation of the method to different thicknesses of the liquid base layer and/or of the substrate.

In addition to the means for displacing the transfer surface in height, for example, by means of a linear actuator, the use of auxiliary pressure means is envisaged, including, for example, a counter pressure element, such as a roller.

The invention envisages the use of a plurality of transfer surfaces. In this manner, it is possible to progressively remove the transfer liquid by means of successive transfer surfaces. Successive transfer surfaces can be understood as transfer surfaces applied successively in the method (successive transfer steps), in particular arranged successively in a system for producing a motif according to the method.

The base layer may be at least partially solidified between the application of successive transfers. In other words, the base layer is solidified at a time between the successive application times of successive transfer surfaces in the method, in particular the solidification means being arranged between said successive transfer surfaces in a system for producing a motif according to the method. It is also envisaged that the pressure exerted by a transfer surface (or by different transfer surfaces) is successively increasing, and/or the height of the transfer surface(s) with respect to the surface of the base layer is successively decreasing. In particular, the pressure exerted by a subsequent successive transfer surface against the base layer is greater than the pressure exerted by a previous successive transfer surface against the base layer. In this manner, the removal of transfer liquid located at a greater depth is facilitated as the method progresses.

Preferably, according to the invention, the transfer surface is cleaned of product resulting from removed transfer liquid. In this manner, the cleaning of transfer liquid is facilitated continuously, unlike the known cleaning systems known in the state of the art, wherein the product resulting from the applied drops is spread around the removal area thereof to a greater or lesser extent, requiring auxiliary cleaning systems, such as suction means.

Preferably, the transfer surface is solid. In particular, the transfer surface is at least partially devoid of liquid. Preferably, the transfer surface is at least partially devoid of an adhesive. Adhesive can be understood as a substance for binding solids, such as glue.

Preferably, the transfer surface has a form such that when it makes contact with the transfer liquid it substantially reproduces the surface of the base layer. In particular, the transfer surface is substantially flat for a substrate in the form of a panel or in the form of a sheet, or the curvature of the transfer surface is substantially the same as the curvature of the substrate or the base layer. Also preferably, the transfer surface extends to, at least, the entire width of the substrate.

It is envisaged that the transfer surface is substantially smooth. Substantially smooth transfer surface can be understood as, in particular, having a surface roughness less than or equal to 2 μm, more in particular, less than or equal to 1 μm (Ra, measured according to ISO standard 4288:1998). In this manner, the cleaning of the transfer surface is facilitated.

However, to increase the wettability of the transfer surface, a sufficiently high roughness can be provided, in particular, greater than 2 μm (Ra, measured according to ISO standard 4288:1998), for example, by scoring the transfer surface. Preferably, the roughness is less than or equal to 50 μm, more preferably, less than or equal to 15 μm (Ra, measured according to ISO standard 4288:1998), which enables the wettability of the transfer surface to be increased without considerably hindering the cleaning thereof.

It is also envisaged that the transfer surface is substantially deformable. Substantially deformable surface can be understood as being able to adapt to a relief to be obtained in the base layer by means of the method, substantially making contact with the surface of the base layer which forms a relief.

According to the invention, motifs with reliefs or textures imitating natural materials can be obtained, such as rock or wood, including grain or cracks. Preferably, for a base layer applied with a thickness of up to 500 μm, in particular from 50 to 200 μm, reliefs with a depth up to equaling the thickness of the base layer can be obtained, in particular from 1 to 500 μm, more in particular from 2 to 200 μm, more in particular from 3 to 50 μm.

A substantially deformable transfer surface can be obtained by using a substantially soft material for the rolling surface, for example rubber, in particular EPDM (ethylene propylene diene). For the purposes of the invention, substantially soft can be understood as, especially, a hardness on the Shore A scale (Shore-A) less than or equal to 50, preferably less than or equal to 30, measured according to ISO 7619-1:2011.

Alternatively or in a complementary manner, the material of the transfer surface can be selected with a suitable surface energy, or surface tension, taking into account that high values of surface energy, or surface tension, of the rolling surface favour the wettability thereof or vice versa, based on the required amount of transfer liquid to be removed with respect to the base layer. In this sense, for example, the use of a porous or low-density material favours the absorption of the transfer liquid due to the effect of the surface tension or capillarity.

In order to fulfil the purpose mentioned in the State of the Art section, in addition to providing additional advantages that can be derived from the present specification, the present invention also provides a system, in particular an apparatus or machine, configured to produce a motif on a surface of a substrate by performing a method according to the invention as described above.

The system according to the invention comprises substrate transport means for transporting the substrate with the base layer and drop application means for applying the drops in or on the base layer. The system is characterised in that it additionally comprises at least one transfer element provided with a transfer surface for transferring said liquid to the transfer surface when the transfer surface makes contact with said liquid, configured so that said contact is without sliding on the base layer in a synchronised manner with the transport of the substrate.

The synchronisation can be performed, in particular, with the substrate being transported or remaining fixed. For example, if the transfer element has the form of a transfer roller which rolls without sliding on the base layer, such that the relative speed, with respect to the base layer, of the roller in contact with the base layer is zero. Likewise, for example, if the transfer element is in the form of a sheet or plate which makes contact with the base layer, such that the relative speed, with respect to the base layer, of the sheet or plate is zero in a direction corresponding to the transport of the substrate.

The transport means can comprise a conveyor belt. The application means can comprise at least one digital print head, in particular inkjet.

Additionally, the system can comprise solidification means for solidifying the base layer, the drops and/or the transfer liquid. The solidification means can comprise curing means, in particular comprising a source of radiation, more in particular electromagnetic radiation, preferably UV radiation. The electromagnetic radiation curing means can have a variable wavelength.

The system can additionally comprise means for applying the base layer, which is in particular liquid, means for pressing on and/or displacing the transfer surface in height with respect to the base layer, means for cleaning product resulting from removed transfer liquid, etc. Preferably, the system comprises control means configured to execute the described method.

BRIEF DESCRIPTION OF THE FIGURES

The following figures are included that serve to illustrate different practical embodiments of the invention that are described below by way of example but not limitation.

Figures 13A, 13B:
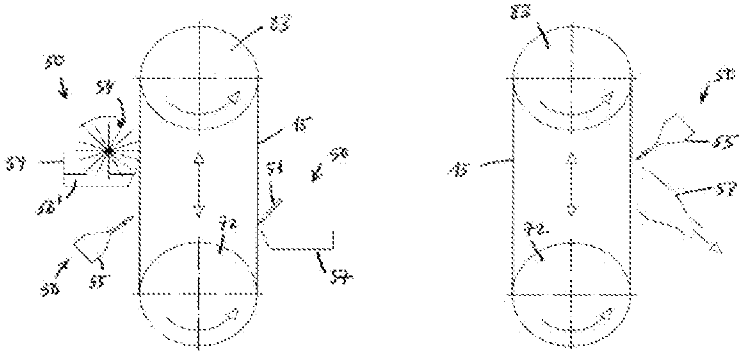
Figure 13C:
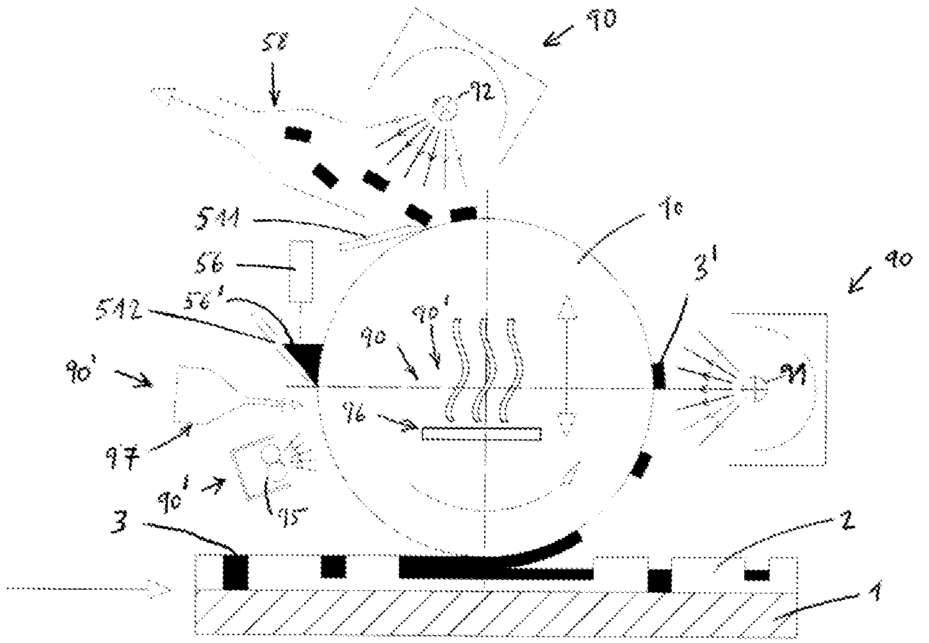
Figure 13D:
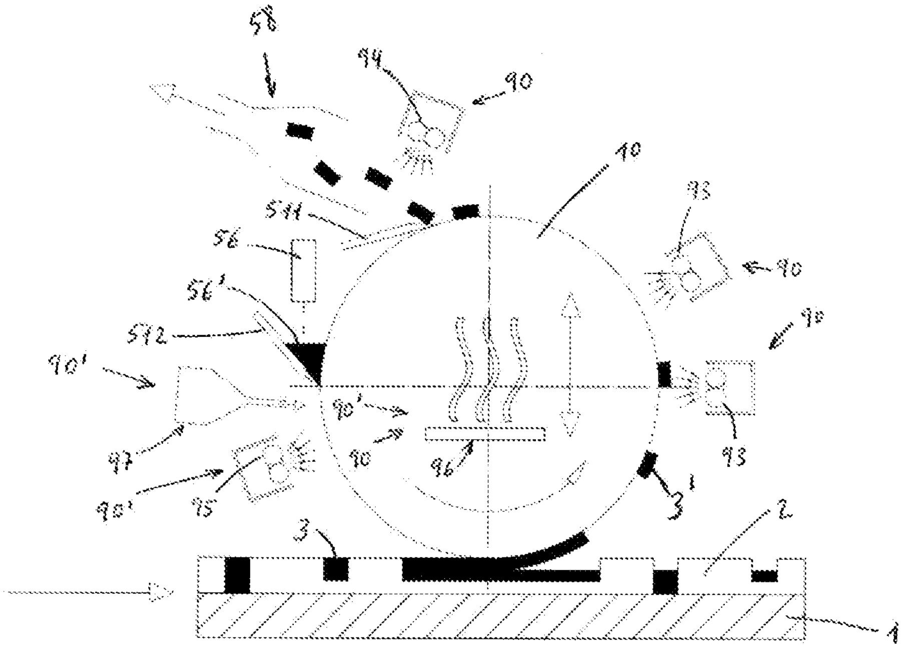
Figure 13E:
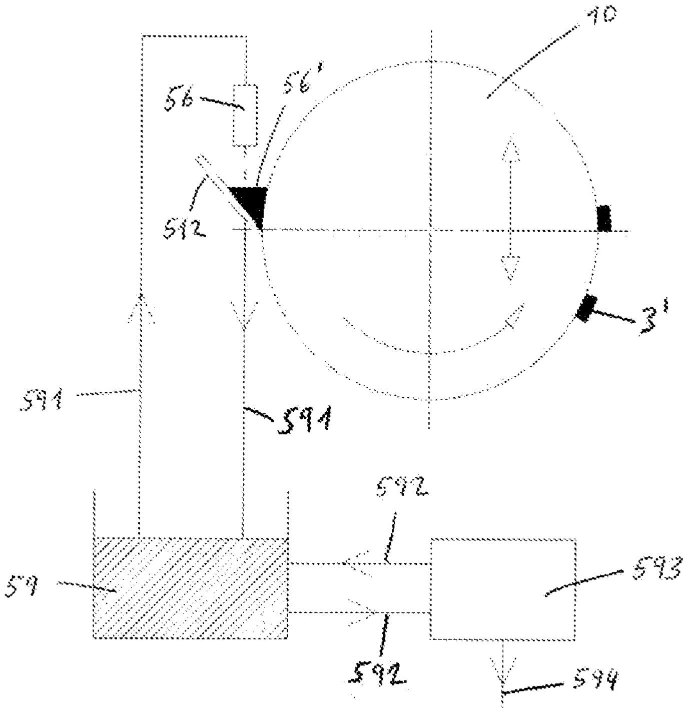

Furthermore, FIGS. 13*c* and 13*d* schematically show different embodiments of auxiliary cleaning means, and FIG. 13*e* schematically shows an embodiment of means for reusing cleaning product, in particular, means for recycling cleaning product. These additional embodiments are each equally applicable independently or in combination with the embodiments of the preceding figures.

Figure 14:
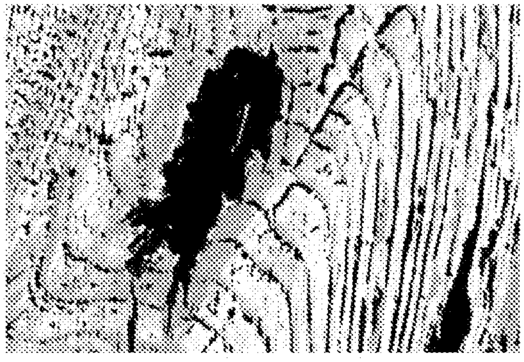

FIG. 14 shows a digital pattern corresponding to a partial area of a relief to be obtained according to an exemplary embodiment according to the invention.

Figure 15A:
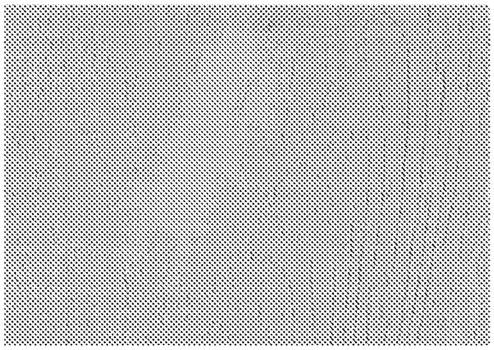
Figure 16A:
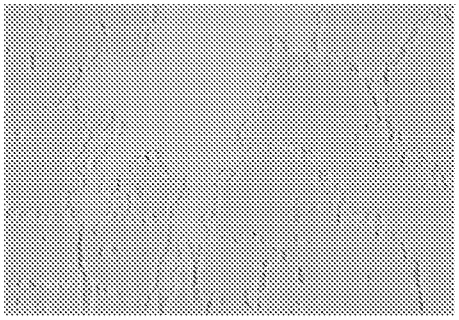
Figure 17A:
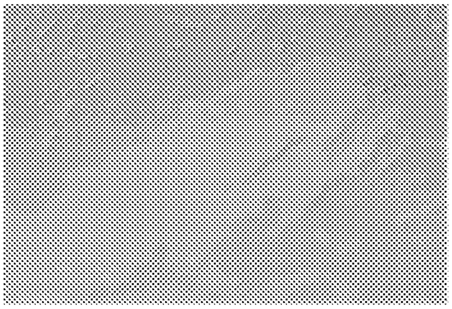

FIGS. 15*a*, 16*a* and 17*a* show photographs of the relief obtained according to the invention based on the digital pattern shown in FIG. 14.

Figure 15B:
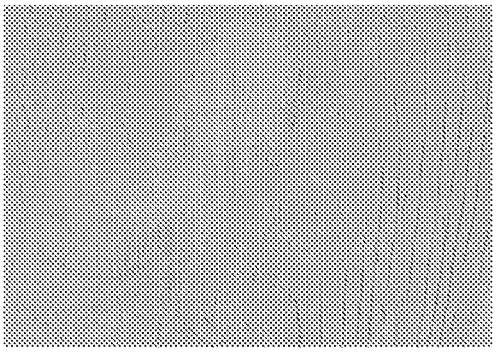
Figure 16B:
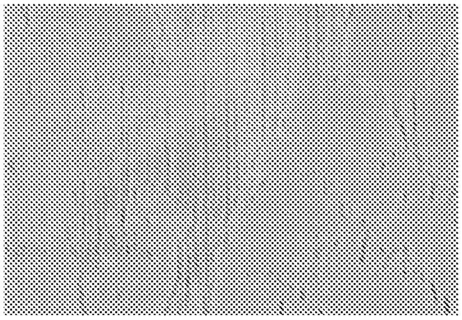
Figure 17B:
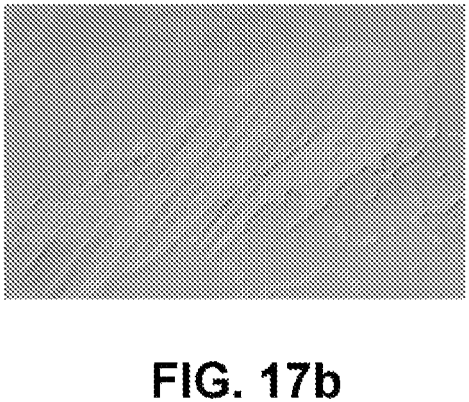

FIGS. 15*b*, 16*b* and 17*b* show photographs of the relief obtained according to a comparative method of the state of the art, wherein the removal of the transfer liquid is performed by means of brushing instead of by means of a transfer roller as in the invention.

Figure 18:
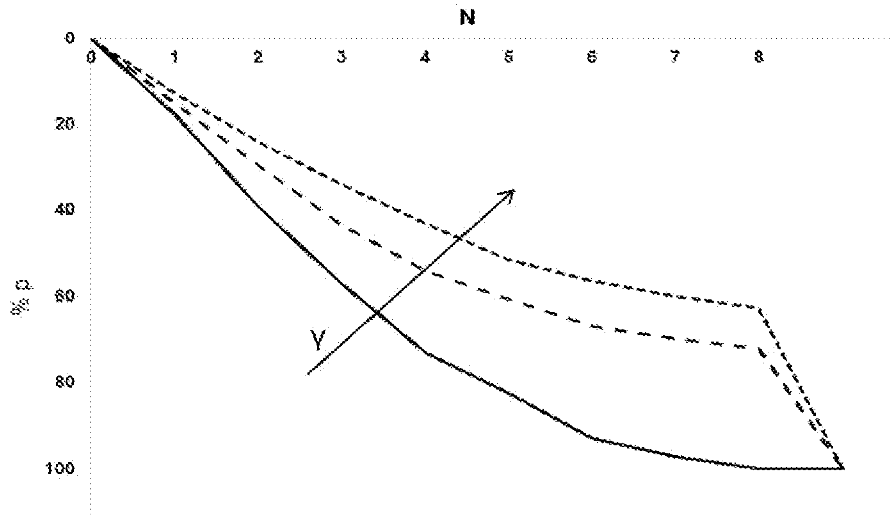

FIG. 18 shows a graph that represents parameters of the method and system based on variants of the exemplary embodiment according to the invention corresponding to FIGS. 14, 15*a*, 16*a* and 17*a*.

DETAILED DESCRIPTION OF THE INVENTION

Figure 1:
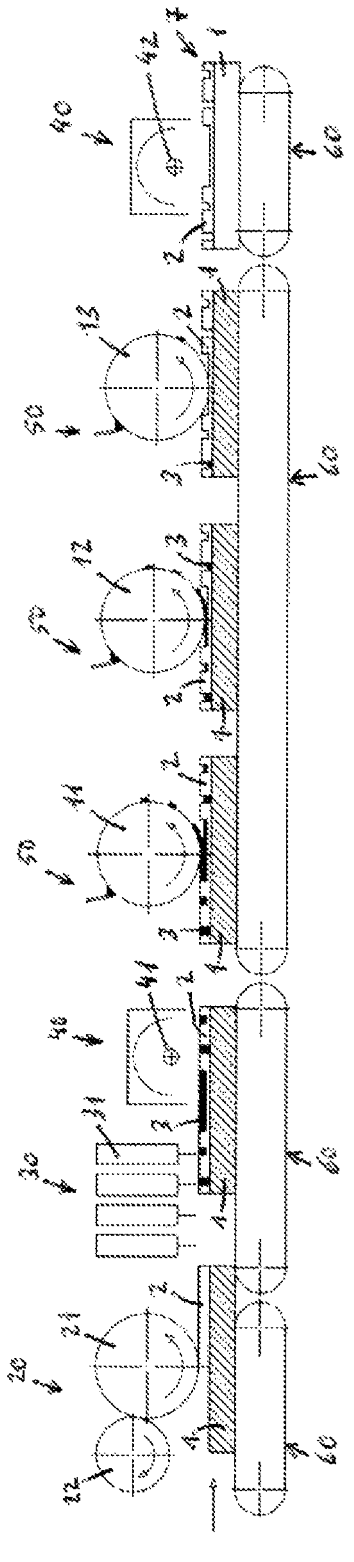
FIG. 1 schematically shows a first embodiment of the method and system for producing a motif according to the invention, wherein the substrate used is in the form of a panel.

FIG. 1 shows a schematic side view of a first embodiment of the system according to the invention, wherein the substrate (1) is in the form of a panel. In the figures, the substrate (1) can be transported advancing in the direction from left to right throughout the different stations of the system, as the steps of the corresponding method are performed. To move the substrate (1), transport means (60) are used which comprise, for example, a conveyor belt (63) or a conveyor roller table, in a manner known per se.

In a first station of the system shown in FIG. 1, a liquid base layer (2) is applied on the substrate (1) by means of liquid base layer application means (20) which, in the embodiment shown, are for application by roller, comprising an applicator roller (21) and a dosing roller (22), in a manner known per se.

As seen in FIG. 1, the drops are then applied on the liquid base layer (2) by means of drop application means (30) which, in the embodiment shown, are for digital printing, comprising at least one inkjet print head (31), each print head (31) comprising a plurality of drop nozzles, corresponding to the different positions or pixels wherein the drops are applied to produce a motif (7), in this case in the form of a relief or texture, in a manner known per se. The motif (7) is revealed by removing the liquid (3).

The applied drops settle into, are introduced into and/or displace the liquid base layer (2) in the positions wherein the drops are applied, due in particular to the features of the base layer (2) and/or the drops such as the viscosity, the surface tension, or surface energy, and the density, as well as application parameters of the drops such as the injection speed and injection volume of the drops, in a manner known per se. The modification of these features or parameters enables the features of the motif (7) to be obtained to be controlled, especially influencing the fluid-dynamic forces which act between the drops and the base layer, in particular by varying the amount of movement of the drops when they are deposited on or impact the surface of the liquid base layer (2), and intermolecular adhesion and/or cohesion forces.

According to the method or system of the invention, the motif (7) is obtained on the substrate (1) by removing by transfer, from the base layer (2), a liquid (3) resulting from the applied drops; in other words, it is determined by, or comprises, at least partially the drops applied. Depending on the way in which the motif (7) is obtained, said transfer liquid (3) may contain, for example, only liquid from the applied drops or consist of a mixture of the liquid from the applied drops with the liquid from the liquid base layer (2) in the positions wherein the drops are applied. Different ways in which a motif can be obtained by removing a liquid (3) resulting from the applied drops are known; all of them can be applied to the present invention.

Continuing with the embodiment of FIG. 1, once the transfer liquid (3) has been formed in the base layer (2), base layer solidification means (40) are applied which, in the embodiment shown, are UV radiation curing by means of at least one initial UV curing lamp (41), said radiation being applied to the assembly of the base layer (1) and the transfer liquid (3). With these initial UV curing lamps (41), partial curing is provided to the base layer (2), which will enable in the following steps of the method, or stations of the system, transfer liquid (3) to be removed, especially without removing base layer (2), by transferring the liquid (3) to a transfer surface (S), in particular, by means of at least one transfer roller (10, 11, 12, 13) according to the invention.

In the embodiment shown in FIG. 1, three successive transfer rollers (11, 12, 13) are applied, configured to progressively remove the transfer liquid (3) when they roll over the base layer (2). To do so, each subsequent successive transfer roller exerts an increasing pressure against the base layer (2), through the respective rolling surface (S) thereof, i.e., the transfer surface (S), the rollers (11, 12, 13) being arranged at increasingly lower heights with respect to the substrate (1). According to the invention, the liquid (3) is removed by transfer by means of the transfer rollers (11, 12, 13), rolling over the base layer (2) through the rolling surface (S), such that the transfer liquid (3) is transferred to the rolling surface (S) by adhesion or wetting of the rolling surface (S) with the liquid (3).

For each transfer roller (11, 12, 13) shown in the embodiment of FIG. 1, transferred liquid cleaning means (50) are provided, which may take the form of a blade (51), configured to clean the liquid (3) transferred from the rolling surface (S) by scraping said surface (S) with the blade (51).

Finally, base layer solidification means (40) are applied which, in the embodiment shown in FIG. 1, are UV curing by means of at least one final UV curing lamp (42). With these final UV curing lamps (42), the base layer (2) is provided with complete curing until the motif (7) is obtained.

Figure 2:
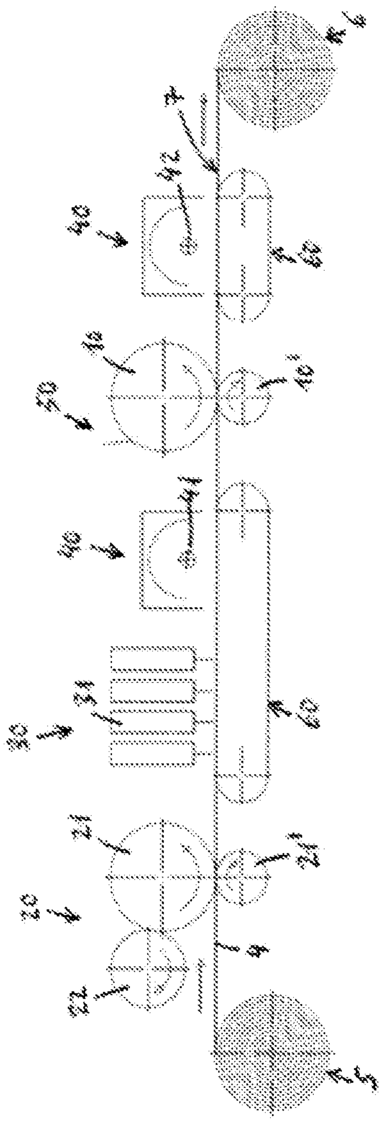
FIG. 2 schematically shows a second embodiment of the method and system for producing a motif according to the invention, wherein the substrate used is in the form of a sheet.

FIG. 2 shows a schematic side view of a second embodiment of the system according to the invention, wherein, unlike the first embodiment, the substrate (4) is in the form of a continuous sheet. The substrate (4) is continuously fed throughout the different stations of the system as the steps of the corresponding method are performed. The substrate (4) is fed from a feed spool (5) and collected in a collection spool (6), once the motif (7) has been formed in the substrate (4).

Advantageously, the invention can be applied to substrates (1; 4) with any form or configuration. Especially, the method can be applied to substrates (4) in the form of a sheet (continuous or discontinuous), unlike the methods of the state of the art wherein the abrasion forces that must be exerted on the base layer (2) in order to remove the liquid or product resulting from the applied drops, for example, by brushing, prevent them from being applied to substrates (4) with low mechanical resistance to shearing stress, such as continuous sheets, since the sheet tends to break as a result of said forces.

Unlike the state of the art, according to the invention, the removal of the liquid (3) resulting from the applied drops is performed by transfer, from the base layer to the transfer surface, substantially by means of the interaction of intermolecular forces, i.e., in a static manner or with the tendency to be in a static or quasi-static manner. In this manner, it is possible to advantageously remove the product resulting from the applied drops in order to produce a motif applied to substrates less resistant to shearing stress, such as thinner sheets.

Analogously to the first embodiment shown in FIG. 1, in the second embodiment shown in FIG. 2, a liquid base layer (2) is first applied on the surface of the substrate (4) by means of base layer application means (20) by roller, which comprise an applicator roller (21) and a dosing roller (22). Then, the drops are applied by means of inkjet drop application means (30), comprising at least one inkjet print head (31), such that the drops determine a transfer liquid (3) in the base layer (2).

Likewise, the system according to this second embodiment shown in FIG. 2 comprises base layer solidification means (40) by means of electromagnetic radiation curing, formed by an initial UV curing lamp (41) and a final UV curing lamp (42). Unlike the first embodiment, this second embodiment incorporates a single transfer roller (10) with corresponding transferred liquid cleaning means (50), comprising a cleaning blade (51).

Continuing with FIG. 2, the transport means (60) of the substrate (4) can comprise guide rollers (not shown) for the substrate (4), in a manner known per se. Likewise, in the application area of the drops and/or in the solidification area, the system can incorporate position fixing means of the substrate in order to prevent unwanted displacements of the substrate (1; 4), and therefore printing and/or solidification defects. The position fixing means of the substrate (1; 4) can be, for example, in the form of a suction chamber of the substrate, in a manner known per se. These means for preventing unwanted displacements are also applicable, in a manner known per se, especially to the first embodiment referring to the substrates (1) in the form of a panel.

Figure 3:
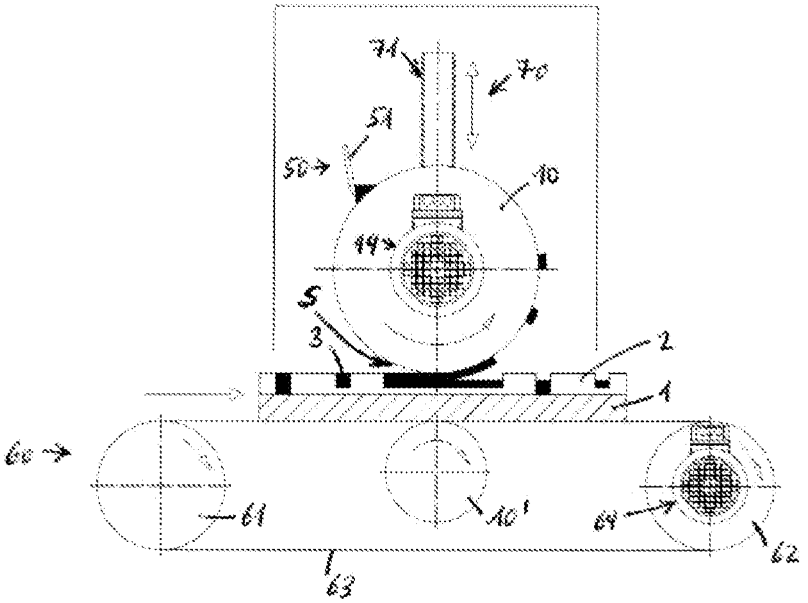
FIG. 3 schematically shows an embodiment of transfer by means of a transfer element in the form of a roller according to the invention applicable to the first embodiment.

FIG. 3 shows a schematic side view of an embodiment of the transfer liquid removal means (3) according to the invention, which are applicable, for example, to the first embodiment shown in FIG. 1, as well as able to be combined with the rest of the embodiments described.

As seen in FIG. 3 in greater detail, the system includes a transfer roller actuator (14) for rotating the transfer roller (10) as it rolls, by means of the rolling surface (S) of the transfer roller (10), over the base layer (2). The transfer roller actuator (14) is configured so that the transfer roller (10) may roll without sliding on the base layer (2), synchronously with the transport of the substrate (1).

As also seen in FIG. 3, the transfer roller (10) presses against the base layer (2) with help from a counter roller (10'), which acts on the opposite side of the substrate (1). The system additionally includes transfer roller pressure means (70) against the base layer (2), in the form of a linear actuator for height displacement (71) of the transfer roller (10).

FIG. 3 also shows in greater detail the substrate transport means (60), comprising a conveyor belt (63), guided by at least one conveyor belt guide roller (61, 62) and actuated by a conveyor belt actuator (64).

Figure 4:
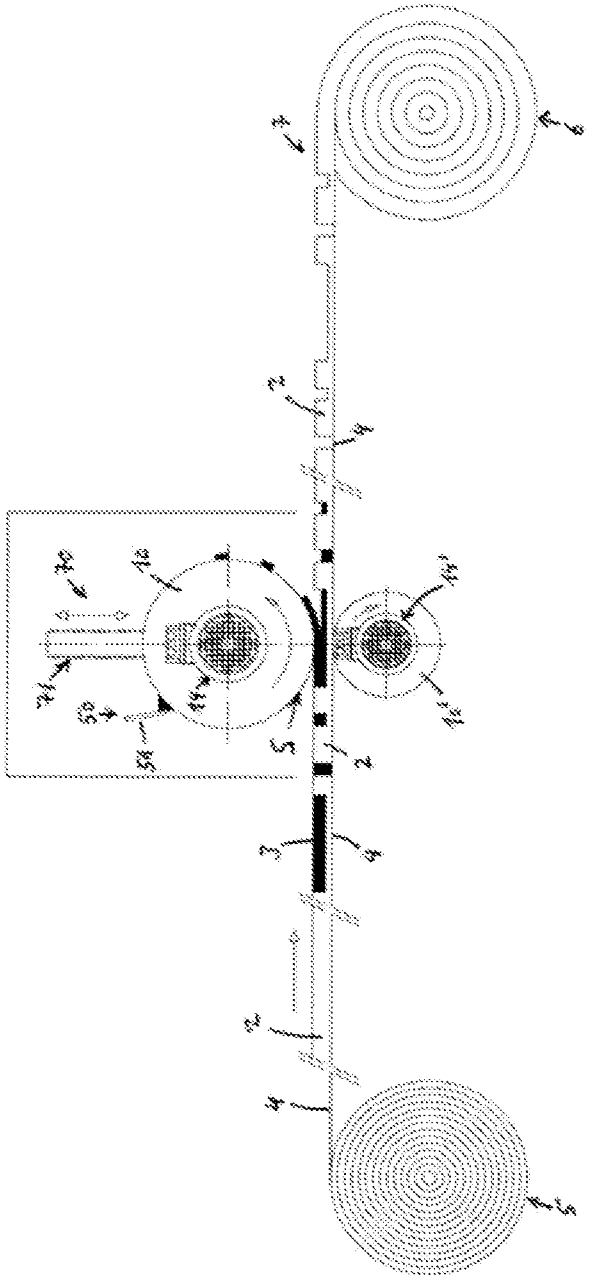
FIG. 4 schematically shows an additional embodiment of transfer by means of a transfer element in the form of a roller according to the invention applicable to the second embodiment.

FIG. 4 shows a schematic side view of an embodiment of the transfer liquid removal means (3) according to the invention, which are applicable, for example, to the second embodiment shown in FIG. 2, as well as able to be combined with the rest of the embodiments described.

As seen in FIG. 4 in greater detail, the system includes a transfer roller actuator (14) for rotating the transfer roller (10) as it rolls, by means of the rolling surface (S) of the transfer roller (10), over the base layer (2). The transfer roller actuator (14) is configured so that the transfer roller (10) may roll without sliding on the base layer (2).

Analogously to the embodiment shown in FIG. 3, in the embodiment of FIG. 4, the transfer roller (10) presses against the base layer (2) with help from a counter roller (10'), which acts on the opposite side of the substrate (4). Likewise, the system additionally includes transfer roller pressure means against the base layer (70), in the form of a linear actuator for height displacement (71) of the transfer roller (10). The counter roller (10') is rotated by an actuator (14') in order to facilitate the guiding of the sheet of the substrate (4).

FIGS. 5 to 8 show schematic side views of respective additional embodiments of the transfer liquid removal means according to the invention, which are applicable, for example, both to the first and second embodiments, as well as able to be combined with each other and with the rest of the embodiments described.

Figure 5:
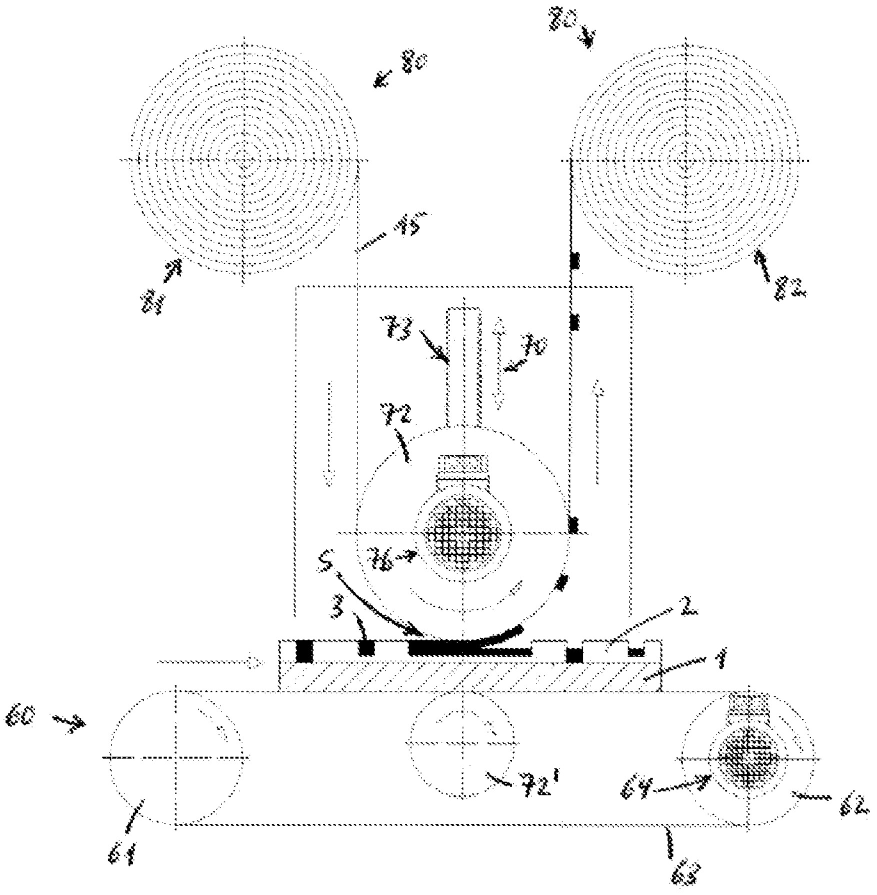
FIGS. 5 to 8 schematically show respective additional embodiments of transfer by means of a transfer element in the form of a continuous sheet according to the invention applicable to both the first and second embodiments.

In the embodiment shown in FIG. 5, unlike the embodiments described above, the transfer surface (S) makes up part of a transfer sheet (15) instead of making up part of a transfer roller (10). The transfer sheet (15) shown is continuous, in other words, it is continuously fed from a feed spool (81) to a collection spool (82). According to the embodiment shown in this FIG. 5, it is envisaged that the transfer liquid (3) removed from the base layer (2) accumulates in said collection spool (82) for the disposal thereof or subsequent treatment which enables it to be reused as a feed spool (81).

Figure 6:
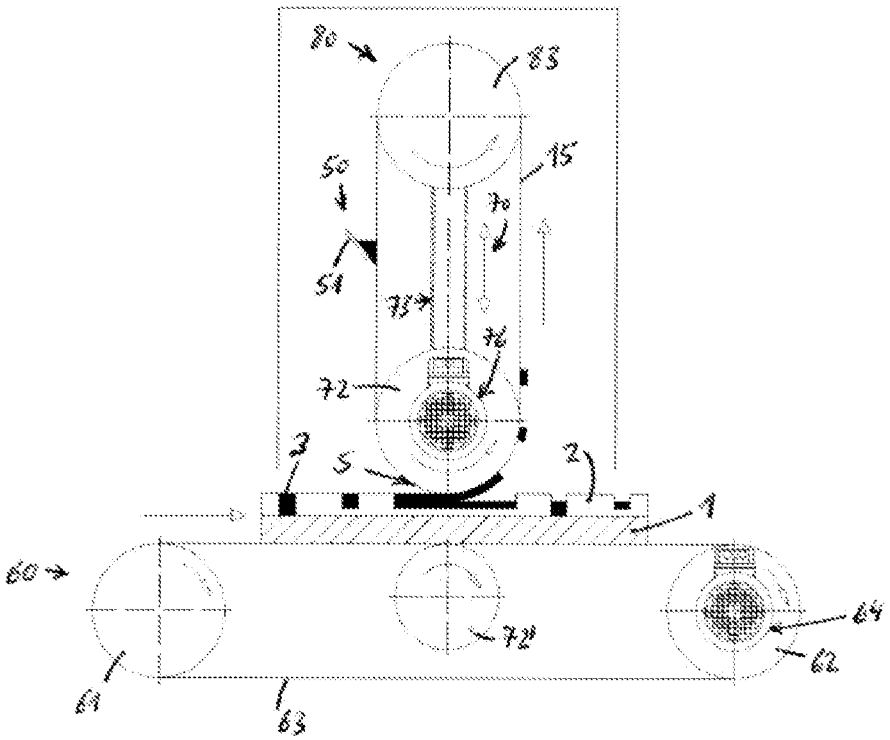

In the embodiment shown in FIG. 6, unlike the embodiments described above, the transfer surface (S) makes up part of a transfer sheet (15) instead of making up part of a transfer roller (10) and, moreover, the transfer sheet (15) is fed continuously in a closed circuit, in other words, the transfer sheet (15) is in the form of an endless band. The transfer sheet (15) is guided in the closed circuit by means of the guide roller (83). In this manner, a larger available space is achieved in the system in order to be able to install auxiliary means such as the cleaning means (50; 51) or the pressure means (70; 73), as seen in this FIG. 6, for example, by taking advantage of the space above the pressure roller (72).

Figure 7:
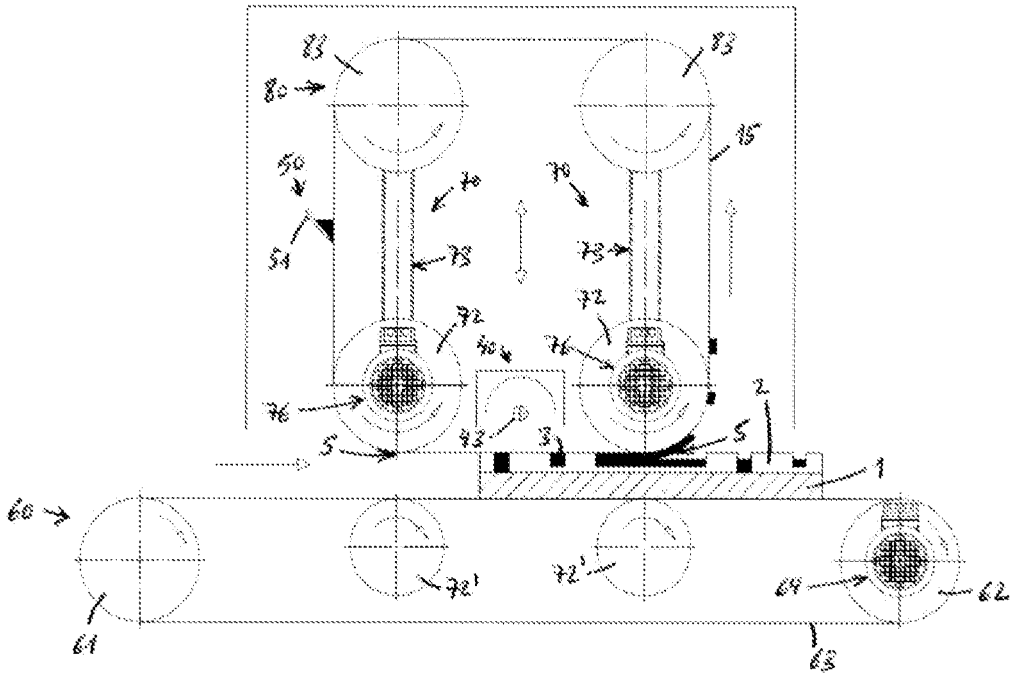

In the embodiment shown in FIG. 7, the transfer sheet (15) is continuously fed in a closed circuit by a plurality of guide rollers, in this case two guide rollers (83), and a plurality of pressure rollers (72), in this case two successive pressure rollers (72). Advantageously, as shown in this FIG. 7, between the successive pressure rollers (72) base layer solidification means (40) can be installed, for example, in the form of electromagnetic radiation curing means, such as at least one UV radiation lamp (43), especially for the case that the transfer sheet (15) is transparent. In this manner, it is possible to optimise the solidification, in particular the curing, of the base layer (2) or the transfer liquid (3) by reducing the amount of air or oxygen between the transfer sheet (15) and the base layer (2) as a consequence of the transfer sheet (15) in this area remaining in contact with the base layer (2) without sliding on the base layer (2), in other words, jointly with the forward movement for the transport of the substrate (1) in the system.

Figure 8:
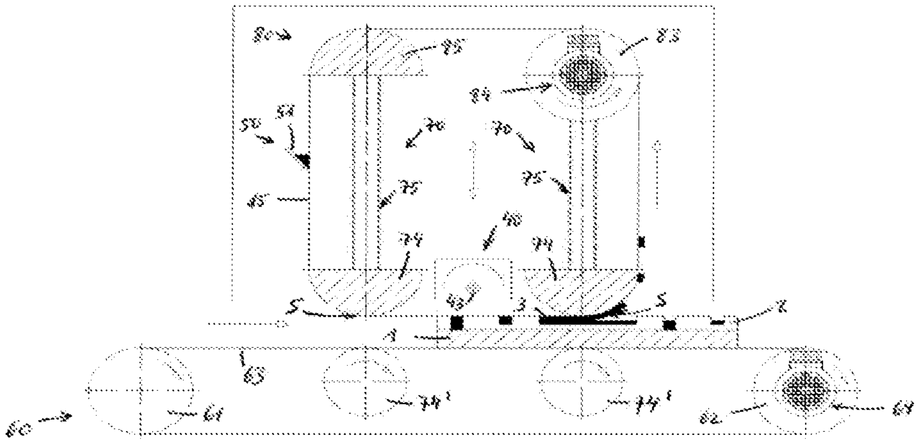
Figure 9A:
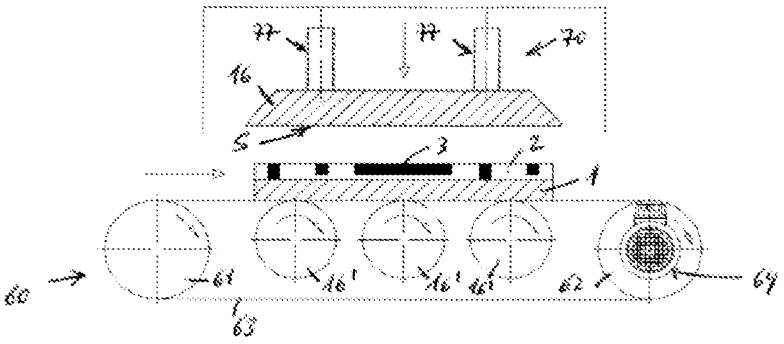
FIGS. 9*a* to 9*d* schematically show a third embodiment of the method and system for producing a motif according to the invention, wherein the transfer is performed while the substrate remains fixed, unlike the first and second embodiments, wherein the transfer is performed while the substrate is transported in the system. The transfer is performed by means of a transfer element in the form of a plate.
Figure 9B:
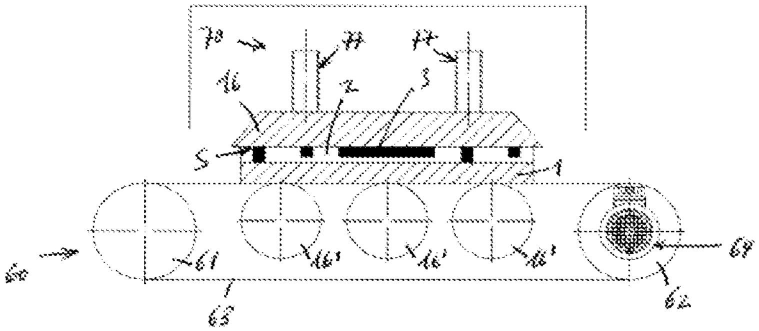
Figure 9C:
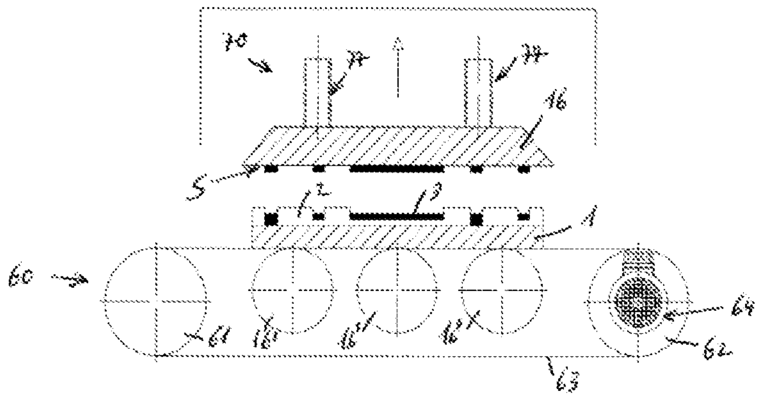
Figure 9D:
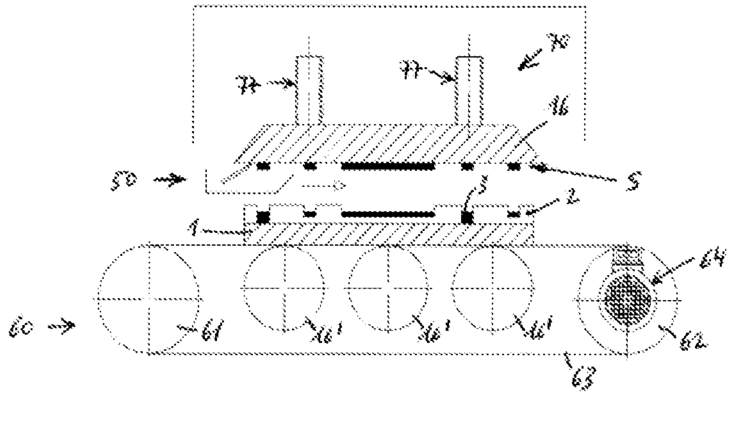

Instead of the guide rollers (83) shown in FIG. 7, some sliding guide element (85) can be used as shown in FIG. 8, made of a suitable material and form in order to reduce the friction between the transfer sheet (15) and the sliding element (85). Likewise, instead of the pressure rollers (72), some sliding pressure element (74) can be used.

FIGS. 9*a* to 9*d* show successive steps of a third embodiment according to the invention wherein the transfer is performed by means of a transfer element in the form of a plate (16) and while the substrate (1) remains fixed. The transfer element (16) once positioned on the substrate (1), FIG. 9*a*, lowers until it makes contact with the base layer (2), FIG. 9*b*. Next, the transfer element (16) is raised, removing the liquid (3) from the base layer (2), FIG. 9*c*. Next, the transfer surface (S) is cleaned (50).

Figure 10:
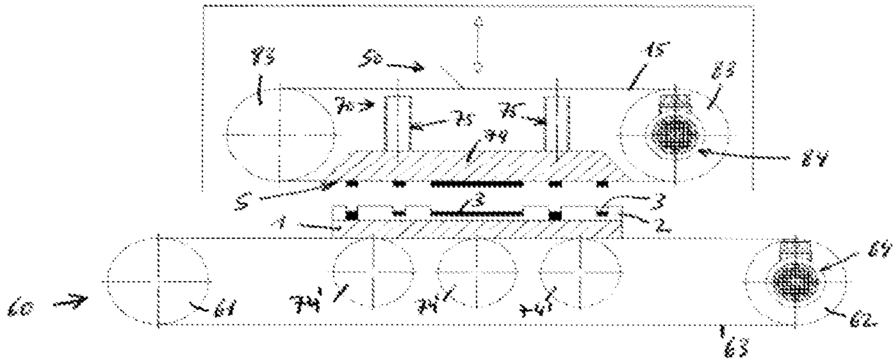
FIGS. 10 and 11 schematically show respective additional embodiments of transfer by means of a transfer element in the form of a continuous sheet according to the invention applicable to any of the first to third embodiments.
Figure 11:
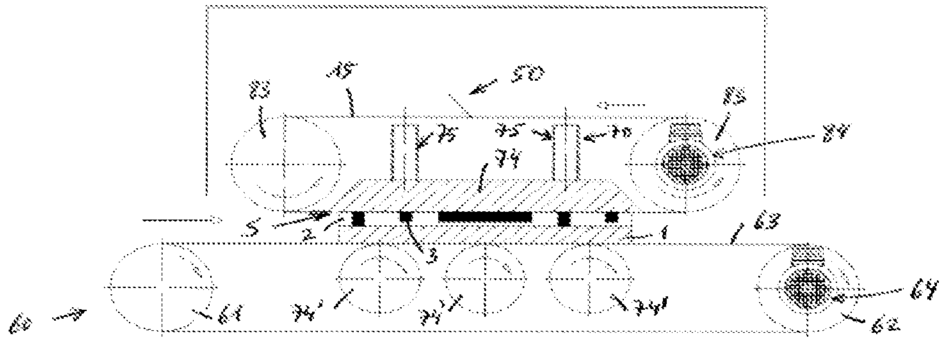

In the embodiments shown in FIGS. 10 and 11, the transfer element is in the form of a sheet (15). The transfer surface (S) is pressed against the base layer (2) while the substrate (1) remains fixed, FIG. 10, or while the substrate (1) is transported, FIG. 11, in the latter case the transfer sheet (15) being fed without sliding on the base layer (2), in other words, moving integrally with the base layer (2). Regarding the embodiments shown in FIGS. 9*a* to 9*d* and 10, it is envisaged that the transfer surface (S) can rise and lower successively in order to make contact with the transfer liquid (3) facing the same surface of the base layer (2), as the transfer liquid (3) is removed at a greater depth.

Another advantage, present, in particular, in the embodiments represented in FIGS. 7 to 11, is derived from the feature that the transfer surface (S) makes contact with the transfer liquid (3), the transfer surface (S) remaining facing or opposite from the base layer, in particular, between two application points of the pressure of the transfer surface (S) against the base layer (2). For example, as shown in FIGS. 7, 8, 10 and 11, the transfer sheet makes contacts with the base layer (2) through a contact surface which extends continuously between two successive pressure elements (72; 74), throughout a certain length and time. Likewise, as shown in FIGS. 9*a* to 9*d*, the front surface of the transfer plate (16) makes contact with the base layer (2) throughout a certain length and time. In this manner, it becomes possible to facilitate the adhesion of the transfer liquid (3) to the transfer surface (S) by increasing said contact time.

FIGS. 12*a* to 12*c* and 13*a* and 13*b* show schematic side views of embodiments of means for cleaning product resulting from liquid transferred (50) to the transfer surface (S), which are applicable to embodiments of the invention, as well as able to be combined with each other and with the rest of the embodiments described.

Figures 12A, 12B, 12C:
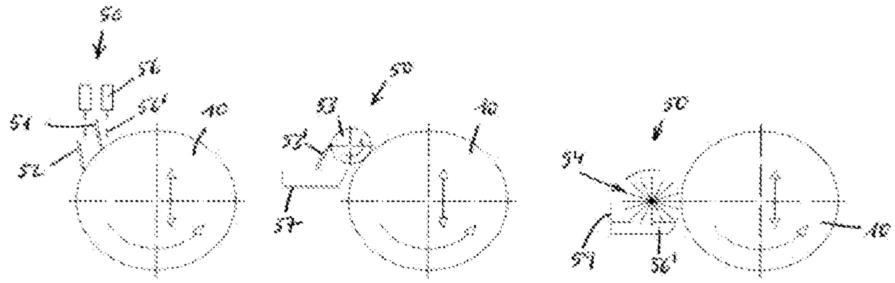
FIGS. 12*a* to 12*c*, 13*a* to 13*e* schematically show different embodiments of transferred liquid cleaning means, each of them being applicable independently or in combination with the embodiments of the preceding figures.

As seen in FIGS. 12*a* to 12*c*, the cleaning means (50) shown are applied to the rolling surface (S) which makes up part of the transfer roller (10) but can also be applied, for example, to a transfer surface (S) which would form part of any other transfer element, for example, a transfer sheet (15) or a transfer plate (16). In FIGS. 13*a* and 13*b* the cleaning means (50) are applied to the transfer surface (S) which makes up part of the transfer sheet (15) but they can also be applied to a rolling surface which will make up part of any other transfer element.

FIG. 12*a* shows cleaning means (50) in the form of a plurality of cleaning blades, in this case two successive cleaning blades (51, 52). In order to facilitate the trapping of the transferred liquid (3) by the blades, a cleaning product (56') can be applied, such as, for example, a solvent of the product resulting from the transferred liquid (3), in particular, by means of a cleaning product applicator (56).

FIG. 12*b* shows cleaning means (50) in the form of a cleaning roller (53) which removes the product resulting from the transferred liquid (3) in order to be cleaned by means of a cleaning blade (53'). The outer surface of the cleaning roller (53) may be configured to be substantially rigid, such as, for example, being metallic. In this manner, it is possible to provide greater resistance to the wear of the cleaning roller (53) than if said surface were deformable, from the wear due to the contact of the blade with said surface. Likewise, the safety of the system is increased by preventing possible snagging of the blade with the roller. In order to collect the cleaned product, a cleaning product collection tank (57) can be arranged.

FIG. 12*c* shows cleaning means (50) in the form of a cleaning brush (54). The cleaning brush (54) can be impregnated with cleaning product supplied from a cleaning product supply tank (59). FIG. 13*a* additionally shows cleaning means (50) in the form of a fluidic cleaning blower, such as a pressurised air blower (55), which enables the transferred product to be removed and/or enables a cleaning product added to same to be dried for the removal thereof. FIG. 13*b* additionally shows cleaning means (50) which comprise a cleaning aspirator (58) for aspirating the cleaned transferred product.

As shown, for example, in FIGS. 13*c* to 13*e*, according to the invention the system comprises dry cleaning means (58, 511) and/or wet cleaning means (56, 56', 512) of the transfer surface (S), to clean the transfer surface (S) of the transferred liquid (3'), respectively, in the absence or in the presence of a cleaning product (56'), in particular a solvent to dissolve the product of transferred liquid (3') transferred to the transfer surface (S), in particular, to dissolve the transferred liquid (3'), mixing the cleaning product (56') with said product of transferred liquid (3'), this product being in a liquid or at least partially solidified state.

In particular, FIGS. 13*c* and 13*d* show dry cleaning means (90) in the form of a first dry cleaning blade (511), configured to clean the transfer surface (S) by dry scraping the same to separate the resulting product of the transferred liquid (3'), in other words without applying cleaning product to the same. The same FIGS. 13*c* and 13*d* also show wet cleaning means in the form of a second wet cleaning blade (512), in other words, configured to clean the transfer surface (S), the resulting product of the transferred liquid (3') being mixed or impregnated with cleaning product when the blade (512) scraps the transfer surface (S), thus facilitating the removal of the product from the transfer surface (S).

The individual or combined use of dry cleaning means (58, 511) and wet cleaning means (56, 56', 512) on a transfer roller (10), as well as in combination with the previously described embodiments, for example, replacing the transfer roller (10) with any other type of transfer element, is not discarded. Likewise, other embodiments of cleaning means other than the blades, such as for example brushes, rollers, blowers or vacuums, which in general can be applied dry or wet, are contemplated. For example, FIGS. 13*c* and 13*d* also show dry cleaning means in the form of a vacuum (58).

The same FIGS. 13*c* and 13*d* additionally represent auxiliary cleaning means, which are configured to help the cleaning means to carry out their cleaning function. Two main types of auxiliary cleaning means can be distinguished according to their function, which in the context of the present specification are called, respectively, auxiliary dry cleaning means (90) and auxiliary wet cleaning means (90').

The auxiliary dry cleaning means (90) are auxiliary cleaning means that facilitate the detachment of the resulting product of the transferred liquid (3') from the transfer surface (S) by the dry cleaning means (58, 511), by means of solidification, drying and/or evaporation of said product of transferred liquid (3'), the auxiliary dry cleaning means (90) therefore being applied to the dry cleaning means (58, 511), these means being external or different from them. These auxiliary dry cleaning means (90) may comprise, for example, heating means, such as heaters with IR lamps (93, 94), air blowing means, in particular with heated air, and/or curing means by electromagnetic radiation, in particular, by UV (91, 92), of the product (3') to be cleaned from the transfer surface (S) by means of the dry cleaning means (58, 511).

The auxiliary dry cleaning means (90) can be applied before and/or during removal of the product (3') from the transfer surface carried out by the dry cleaning means (58, 511). In particular, it is contemplated that the application of these auxiliary means (90) to the product of transferred liquid (3') is carried out in surroundings of the cleaning means (for example, of the blade, brush, roller, blower, vacuum, etc.) in which the product is being separated from the transfer surface (S). The auxiliary dry cleaning means (90) facilitate the separation of the product (3') from the transfer surface (S) by mechanical or fluidic means, as a result of its lesser adherence to the transfer surface (S). These auxiliary dry cleaning means (90) also make it possible to simplify the maintenance of the very cleaning means, since it is generally easier to clean surfaces with solid residue than with liquid residue, which can be deposited on surfaces of the cleaning means.

Furthermore, the auxiliary wet cleaning means (90') are auxiliary cleaning means that remove the cleaning product (56') applied by the wet cleaning means (56, 56', 512) of the transfer surface (S) in a controlled manner, by means of drying and/or evaporating said applied cleaning product (56'), in particular a solvent of the product of transferred liquid (3') transferred to the transfer surface (S), therefore being applicable to the wet cleaning means (56, 56', 512). It is contemplated that the removal of cleaning product (56') carried out by the auxiliary wet cleaning means (90') is performed in the absence of applying dry cleaning means (90) or wet cleaning means (90') on the same cleaning product (56').

These auxiliary wet cleaning means (90') may comprise, for example, heating means such as heaters with IR lamps (95) and/or air blowing means (97), in particular with heated air. These auxiliary means (90') are applied on the transfer surface (S) after the cleaning product (56') is applied and before said surface (S) comes in contact with the base layer (2) to transfer the transfer liquid (3). The auxiliary wet cleaning means (90') make it possible to control that the transfer surface (S) has the suitable adherence properties (such as wetting or surface tension) in order to properly transfer the transfer liquid (3) to the transfer element (10) when said transfer surface (S) comes in contact with the transfer liquid (3) on the base layer (2).

Likewise, heating the very transfer element (10) by means of thermal conduction is also contemplated as auxiliary dry cleaning means (90) and auxiliary wet cleaning means (90'). For example, as shown in FIGS. 13*c* and 13*d*, the transfer roller (10) is heated by a heater (96) that may comprise an electrical resistance for heating, at least locally on the transfer surface. These auxiliary cleaning means (96) have the advantage that their use is allowed both as auxiliary dry cleaning means (90), by heating the product of the transferred liquid (3') transferred to the transfer element while said liquid remains on the transfer surface (S) until it is removed by the dry cleaning means, and as auxiliary wet cleaning means (90'), by heating the residue of cleaning product (56') for its removal from the transfer surface (S).

According to the invention, it is also envisaged that the system may comprise wet cleaning means that comprise means for reusing the cleaning product (56'). FIG. 13*e* represents means for reusing cleaning product (59, 591), which are applied to the wet cleaning means (56, 56', 512). These means for reusing (59, 591) the cleaning product (56') comprise means for recirculating the cleaning product (591) for its reuse between a cleaning product supply tank (59) and its application on the transfer surface (S), for example by an applicator (56), through a cleaning product circulation duct (591).

Likewise, as also shown in FIG. 13*e*, the means of reuse (59, 591) comprise cleaning product recycling means (592, 593, 594) for the cleaning product that is reused. The cleaning product recycling means (592, 593, 594) may comprise a recycling unit (593), for example, by distillation of the cleaning product, the recycling unit (593) being connected to the cleaning product supply tank (59) by cleaning product circulation ducts (592), recycling waste by distillation of cleaning product being extracted through the outlet duct (594).

As solvent cleaning products, acetone, butyl glycol and dipropylene glycol methyl ether (ordered from lowest to highest molecular weight), for example, can be used. Solvents with high molecular weight have the advantage that they are less volatile, which facilitates their processing and reuse. However, a sufficiently high volatility of the cleaning product is also of interest to facilitate evaporation of the same after its application on the transfer surface (S), before the transfer element (10) comes back into contact with the base layer (2) to remove more transfer liquid (3) once again, taking into account that as explained above the presence of cleaning product (56') on the transfer element (10) may alter the wetting or surface tension characteristics during contact. Therefore, a suitable compromise solution is to use cleaning product (56'), in particular, a solvent of the product of the transferred liquid (3'), with a molecular weight between 55 and 150 g/mol, and preferably between 100 and 125 g/m, such as, for example, butyl glycol. Additionally, the volatility of the cleaning product can be varied by modifying its polarity, taking into account that a higher polarity implies a lower volatility of the cleaning product. For the cleaning product (56') to suitably dissolve the product of transferred liquid (3'), a suitable polarity of said products can also be selected, preferably being substantially similar.

According to the invention, what is described for the system that comprises different specified means for performing different steps is also generally applied to a method for producing a motif that comprises said steps, meaning that the method according to the invention is not necessarily limited to the direct use of the system or the means described.

Practical Example of Producing Negative Reliefs or Recesses in the Base Layer According to an Embodiment of the Method of the Invention To perform this practical example, a substrate in the form of a 5 mm-thick SPC ("Stone Plastic Composite") panel was used. On the flat front surface of the previously treated substrate, a liquid base layer was applied by roller, with the following features of the liquid base layer applied.

- Composition: UV-curable transparent polymerisable resin.
- Viscosity (25° C.): 7.5 Pa·s.
- Surface tension (25° C.): 22 mN/m.
- Density (25° C.): 1.4 g/cm3.
- Thickness: 175 μm.

Then, the drops were injected on the liquid base layer by means of digital inkjet printing, with the following features of the drops applied.

- Composition: Partially UV-curable transparent polymerisable resin with respect to the resin used for the liquid base layer.
- Viscosity (25° C.): 11 mPa·s.
- Surface tension (25° C.): 35 mN/m.
- Density (25° C.): 1.0 g/cm3.
- Ejection speed: 5 m/s.
- Ejection volume: 25-45 pL.

Next, an initial UV electromagnetic radiation was applied to the assembly of the base layer and the transfer liquid (mixture of the drops with the liquid base layer) until the base layer was partially cured ($\gamma \cong 25\%$). The radiation was applied by means of Ga and Hg UV lamps, with 120 W/cm. Once said initial UV radiation was applied, the base layer had a measured surface energy (25° C.) of 58 mN/m.

Then, the transfer liquid was removed by using four successive transfer rollers according to the invention, provided with a substantially smooth rolling surface (transfer surface) and in correspondence with the flat surface of the substrate, covering the entire width of the substrate, with the following features.

- Material of the rolling surface: EPDM (ethylene propylene diene rubber), Shore-A hardness, measured according to standard ISO 7619-1:2011.
- Roughness of the rolling surface: 2 μm (Ra, measured according to ISO standard 4288)
- Outer diameter of the transfer roller (corresponding to the rolling surface): 245 mm.
- Surface energy of the rolling surface: 56 mN/m.

The transfer rolls were applied by pressing on the base layer with increasing pressure, reducing the height of each successive transfer roll in a corresponding manner by, approximately, 50 by 50 μm, starting from the level of the surface of the base layer.

Finally, a final UV electromagnetic radiation was applied to the assembly of the base layer and the (remaining) transfer liquid until the curing energy of the base layer was completed. The radiation was applied by means of Ga and Hg UV lamps, with 120 W/cm. The total energy applied (sum of the initial and final radiated energies in the UV-A, UV-B and UV-C ranges) measured was 440 mJ/cm2.

No subsequent finishing layer or treatment was applied, the relief being directly obtained with the resulting base layer.

The exemplary embodiment described was made by varying the number of transfer rollers (N) between the initial UV curing and the final UV curing, as well as by varying the initial degree of curing ($\gamma$). The graph in FIG. 18 shows the resulting transfer liquid removed as a percentage of the transfer liquid removed with respect to the total (% p), after the transfer to each successive transfer roller (N=1 to 8), for values of initial degrees of curing of $\gamma \cong 25\%$ (lower curve), $\gamma \cong 75\%$ (intermediate curve) and $\gamma \cong 100\%$ (upper curve), curing not being performed between successive rollers.

As seen in this graph, a lower degree of initial curing, especially $\gamma \cong 25\%$, enables a larger amount of transfer fluid to be removed with a fewer number (N) of transfer rollers. Moreover, said initial curing is sufficient so that the surface energy of the initially cured base layer is greater than or equal to the surface energy of the rolling surface, such that the base layer without transfer liquid is prevented from being transferred to the rolling surface, only transfer liquid being transferred.

Comparison of the Previous Exemplary Embodiment with the Production of Negative Reliefs or Recesses in the Base Layer by Means of Brushing A substrate with the same features as the one used in the described exemplary embodiment was used. Likewise, the liquid base layer and the drops were applied with the same features and in the same manner.

Unlike the described exemplary embodiment, a single initial UV electromagnetic radiation was applied to the assembly of the base layer and the transfer liquid (mixture of the drops with the liquid base layer) until the base layer was fully cured ($\gamma \cong 100$), in other words, by applying a total energy of 440 mJ/cm2.

The transfer liquid was then removed by means of brushing with two successive brushing rollers with metal bristles in order to remove approximately the same amount of transfer liquid as with the described exemplary embodiment. The first brushing roller was applied with a linear speed in contact with the base layer in the advance direction of the substrate, while the second successive brushing roller was applied in the opposite direction. The brushing rollers used have the following features.

- Outer diameter: 220 mm.
- Bristle length: 40 mm.
- Rotation speed: 650 rpm.

No subsequent finishing layer or treatment was applied, the relief of the substrate being directly obtained with the resulting base layer.

FIG. 14 shows the digital pattern processed in the digital inkjet printing of the drops for a partial area of the relief which was obtained (corresponding to an area of 7 cm×10 cm on a real scale). The digital pattern takes the form of a greyscale image, wherein the colour black represents the maximum depth of the relief (175 μm) and the colour white represents no depth (level with the base layer).

FIG. 15*a* is a vertical photograph of a plan view of the relief obtained based on the exemplary embodiment according to the invention described, for the partial area corresponding to the digital pattern shown in FIG. 14. FIG. 16*a* shows an enlarged detail of the same photograph of 15*a*.

FIG. 17*a* is an angled photograph of the relief obtained based on the exemplary embodiment according to the invention, for the same partial area of the photograph of FIG. 16*a*.

In contrast to FIGS. 15*a*, 16*a* and 17*a*, FIGS. 15*b*, 16*b* and 17*b* show the photographs corresponding to the same partial area obtained with the same digital pattern, but for the relief obtained by applying this example of producing negative reliefs by means of brushing.

As clearly seen in these figures, the relief obtained by means of the exemplary embodiment according to the invention has a greater definition, having areas with imperceptible recesses in the example by means of brushing, as well as the absence of defects due to the abrasion of the metal bristles. Although it may be of interest to obtain motifs with a surface that has a rustic appearance as a result of the abrasion of the metallic bristles of the brushing, in other cases it may be of interest to obtain surfaces that are perfectly smooth or have the suitable gloss, for which, according to the invention, the use of brushes or other known removal means can be omitted or reduced in order to remove the transfer liquid. However, according to the invention, said known means can also be used in a complementary manner.

LIST OF REFERENCE SIGNS

1 substrate in the form of a panel
2 base layer
3 transfer fluid
4 substrate in the form of a continuous sheet
5 feed spool of substrate in the form of a continuous sheet
6 collection spool of substrate in the form of a continuous sheet
7 motif obtained
10 transfer roller
10' counter roller of transfer roller
11 first transfer roller
12 second transfer roller
13 third transfer roller
14 rotation actuator of transfer roller
14 rotation actuator of transfer counter roller
15 transfer sheet
16 transfer plate
16' counter roller of transfer plate
20 liquid base layer application means
21 base layer applicator roller
21' counter roller of base layer applicator roller
22 base layer dosing roller
30 drop application means
31 inkjet print head
40 solidification means
41 initial UV curing lamp
42 final UV curing lamp
43 intermediate UV curing lamp
50 transfer liquid cleaning means
51 transfer surface cleaning blade
52 additional transfer surface cleaning blade
53 cleaning roller
53' cleaning roller cleaning blade
54 transfer surface cleaning brush
55 cleaning air blower
56 cleaning product applicator
56' cleaning product
57 cleaning product collection tank
58 cleaning aspirator
59 cleaning product supply tank
511 dry cleaning blade
512 wet cleaning blade
591 cleaning product circulation duct for its reuse
592 cleaning product circulation duct for its recycling
593 recycling unit by distillation of cleaning product
594 recycling waste outlet duct by distillation of cleaning product
60 substrate transport means
61 first conveyor belt guide roller
62 second conveyor belt guide roller
63 substrate conveyor belt
64 rotation actuator of conveyor belt guide roller
70 transfer surface pressure means against base layer
71 displacement actuator of transfer roller
72 pressure roller of transfer sheet
72' counter roller of pressure roller
73 displacement actuator of pressure roller
74 sliding pressure element of transfer sheet
74' counter roller of sliding pressure element
75 displacement actuator of sliding pressure element
76 rotation actuator of pressure roller
77 displacement actuator of transfer plate
80 continuous feed means of transfer sheet
81 transfer sheet feed spool
82 transfer sheet collection spool
83 guide roller of transfer sheet
84 rotation actuator of guide roller of transfer sheet
85 sliding guide element of transfer sheet
90 auxiliary dry cleaning means
90' auxiliary wet cleaning means
91 UV curing lamp before dry cleaning
92 UV curing lamp during dry cleaning
93 IR heating lamp before dry cleaning
94 IR heating lamp during dry cleaning
95 IR heating lamp after wet cleaning
96 thermal conduction roller heater
97 air blower after wet cleaning
S transfer surface
% p percentage of transfer liquid removed
N number of transfer rollers
$\gamma$ degree of initial curing of the base layer

The invention claimed is:

1. A method for producing a motif (7) on a substrate (1; 4), comprising, successively, providing a base layer (2) at least partially covering the substrate (1; 4), applying a plurality of drops in or on the base layer (2), and transferring at least part of a liquid (3) that comprises said plurality of drops or is at least partially determined by them to a transfer surface(S), by adhesion of said liquid (3) to the transfer surface (S) when the transfer surface (S) makes contact with said liquid (3) without sliding on the base layer (2), in order to at least partially reveal the motif (7), wherein the transfer surface (S) is pressed against the base layer (2) and/or is brought closer to the base layer (2), when said liquid (3) is transferred, and wherein the pressure against the base layer (2) is increasing, and/or the height of the transfer surface (S) is decreasing, with respect to the surface of the base layer, successively.

2. The method for producing a motif (7) according to claim 1, wherein the transfer surface (S) is a rolling surface of a transfer roller (10).

3. The method for producing a motif (7) according to claim 1, wherein the transfer surface (S) is a front surface of a transfer sheet (15).

4. The method for producing a motif (7) according to claim 3, wherein the transfer sheet (15) is continuously fed, from a transfer sheet feed spool (81) and/or to a transfer sheet collection spool (82), or in a closed circuit.

5. The method for producing a motif (7) according to claim 1, wherein said liquid (3) is transferred while the substrate (1; 4) is transported or while the substrate (1; 4) remains fixed.

6. The method for producing a motif (7) according to claim 1, wherein the transfer surface (S) is cleaned of transferred liquid (3), while additional liquid (3) is transferred to the transfer surface (S).

7. The method for producing a motif (7) according to claim 1, wherein the transfer surface (S) has a form such that when making contact with said liquid (3) substantially reproduces the surface of the base layer (2), the transfer surface (S) being substantially flat for a substrate in the form of a panel (1) or in the form of a sheet (4), and/or the transfer surface (S) is substantially smooth and/or the transfer surface (S) is substantially elastically deformable.

8. The method for producing a motif (7) according to claim 1, wherein the transfer surface (S) has a surface roughness less than or equal to 50 μm.

9. The method for producing a motif (7) according to claim 1, comprising at least partially solidifying the base layer (2) before and/or after transferring said liquid (3), the base layer (2) being at least partially liquid when the plurality of drops is applied.

10. The method for producing a motif (7) according to claim 9, wherein the base layer (2) is at least partially solidified before transferring said liquid (3) in order to achieve a surface tension, or surface energy, of the base layer (2) greater than the surface energy of the transfer surface (S) when said liquid (3) is transferred.

11. The method for producing a motif (7) according to claim 1, wherein the base layer (2), the applied drops and/or the liquid (3) are at least partially solidified by curing.

12. The method for producing a motif (7) according to claim 1, wherein the drops are applied selectively, according to a digital pattern.

13. A system for producing a motif (7) on a substrate (1; 4) performing a method according to claim 1, comprising substrate transport means (60) for transporting the substrate (1; 4) with the base layer (2), and drop application means (30) for applying the drops in or on the base layer (2), at least one transfer element (10) provided with a transfer surface (S) for transferring said liquid (3) to the transfer surface (S) when the transfer surface (S) makes contact with said liquid (3) to at least partially reveal the motif (7), the at least one transfer element (10) being configured so that said contact is without sliding on the base layer (2) in a synchronised manner with the transport of the substrate (1; 4), and dry cleaning means (58, 511) for cleaning the transfer surface (S) in the absence of a cleaning product (56'), in particular a solvent of the product of transferred liquid (3') transferred to the transfer surface (S), further comprising auxiliary dry cleaning means (90) for facilitating the detachment of the product of transferred liquid (3') from the transfer surface (S) by the dry cleaning means (58, 511), by solidification, drying and/or evaporation of said product of transferred liquid (3') in the absence of applying cleaning means on the same product of transferred liquid (3').

14. The system for producing a motif (7) according to claim 13, wherein the auxiliary dry cleaning means (90) comprise: heating means by thermal radiation; heating means by thermal conduction; curing means; and/or air blowing means.

15. The system for producing a motif (7) according to claim 13, wherein the auxiliary dry cleaning means (90) are configured to be applied to the product of transferred liquid (3') on the transfer element (10) before and/or during its separation from the transfer surface (S), in particular in surroundings of the dry cleaning means (90) in which said separation is carried out.

16. The system for producing a motif (7) according to claim 13, comprising wet cleaning means (56, 56', 512) for cleaning the transfer surface (S) in the presence of a cleaning product (56'), in particular a solvent of the product of transferred liquid (3') transferred to the transfer surface (S), further comprising auxiliary wet cleaning means (90') for removing cleaning product (56') applied by the wet cleaning means (56, 56', 512) from the transfer surface (S), by drying and/or evaporation of said cleaning product (56') in the absence of applying cleaning means on the same cleaning product (56').

17. A system for producing a motif (7) on a substrate (1; 4) performing a method according to claim 1, comprising substrate transport means (60) for transporting the substrate (1; 4) with the base layer (2), drop application means (30) for applying the drops in or on the base layer (2), at least one transfer element (10) provided with a transfer surface (S) for transferring said liquid (3) to the transfer surface (S) when the transfer surface (S) makes contact with said liquid (3) to at least partially reveal the motif (7), the at least one transfer element (10) being configured so that said contact is without sliding on the base layer (2) in a synchronised manner with the transport of the substrate (1; 4), and wet cleaning means (56, 56', 512) for cleaning the transfer surface (S) in the presence of a cleaning product (56'), in particular a solvent of the product of transferred liquid (3') transferred to the transfer surface (S), further comprising auxiliary wet cleaning means (90') for removing cleaning product (56') applied by the wet cleaning means (56, 56', 512) from the transfer surface (S), by drying and/or evaporation of said cleaning product (56') in the absence of applying cleaning means on the same cleaning product (56').

18. The system for producing a motif (7) according to claim 17, wherein the auxiliary wet cleaning means (90') comprise: heating means by thermal radiation; heating means by thermal conduction; and/or air blowing means (97).

19. The system for producing a motif (7) according to claim 17, wherein the wet cleaning means (56, 56', 512) comprise means for reusing (59, 591) the cleaning product (56'), wherein the cleaning product (56') is recirculated for reuse through a cleaning product recirculation circuit (59, 591).

20. The system for producing a motif (7) according to claim 19, wherein the means of reuse (59, 591) additionally comprise recycling means (592, 593, 594) of the cleaning product (56'), more in particular, recycling by distillation of the cleaning product (56').

21. The system for producing a motif (7) according to claim 17, wherein the cleaning product (56') has a molecular weight between 55 and 150 g/mol.

* * * * *